United States Patent
Beckhardt

(10) Patent No.: US 9,223,862 B2
(45) Date of Patent: Dec. 29, 2015

(54) REMOTE STORAGE AND PROVISIONING OF LOCAL-MEDIA INDEX

(71) Applicant: Sonos, Inc., Santa Barbara, CA (US)

(72) Inventor: Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 68 days.

(21) Appl. No.: 14/222,019

(22) Filed: Mar. 21, 2014

(65) Prior Publication Data

US 2015/0269170 A1 Sep. 24, 2015

(51) Int. Cl.
*G06F 17/00* (2006.01)
*G06F 17/30* (2006.01)
*H04L 29/08* (2006.01)

(52) U.S. Cl.
CPC ............ *G06F 17/3074* (2013.01); *H04L 67/10* (2013.01)

(58) Field of Classification Search
CPC .......... G06F 17/30017; G06F 17/3002; G06F 17/3005; G06F 17/30053; G06F 17/3074; G06F 17/30743; G06F 17/30749; G06F 17/30755; G06F 17/30769; G06F 17/30775; G06F 17/30778; G06F 17/30752; G06F 17/3012; G06F 17/30144; G06F 17/30997
See application file for complete search history.

(56) References Cited

U.S. PATENT DOCUMENTS

| | | | |
|---|---|---|---|
| 5,923,902 A | 7/1999 | Inagaki | |
| 6,256,554 B1 | 7/2001 | DiLorenzo | |
| 6,404,811 B1 | 6/2002 | Cvetko et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,483,538 B2 | 1/2009 | McCarty et al. | |

(Continued)

FOREIGN PATENT DOCUMENTS

WO 0153994 7/2001

OTHER PUBLICATIONS

"Bluetooth. "Specification of the Bluetooth System: The ad hoc SCATTERNET for affordable and highly functional wireless connectivity" Core, Version 1.0 A, Jul. 26, 1999, 1068 pages". (in four parts due to size).

(Continued)

*Primary Examiner* — Andrew C Flanders
(74) *Attorney, Agent, or Firm* — McDonnell Boehnen Hulbert & Berghoff LLP

(57) ABSTRACT

Embodiments described herein involve remote storage and provisioning of a local-media index. An example method may involve storing, by a computing system, a local-media index that identifies a plurality of multimedia items that are stored within a local area network and accessible within the local area network by a playback device of a media playback system within the local area network, and sending a message over a wide area network that indicates at least a portion of the local-media index to the media playback system. Another example method may involve, determining that a first local-media index is inaccessible over a wide area network to the media playback system, and then providing an identification of at least one multimedia item based on a second local-media index.

20 Claims, 8 Drawing Sheets

(56) References Cited

U.S. PATENT DOCUMENTS

| | | | |
|---|---|---|---|
| 7,496,623 | B2 | 2/2009 | Szeto et al. |
| 7,496,633 | B2 | 2/2009 | Szeto et al. |
| 7,571,014 | B1 | 8/2009 | Lambourne et al. |
| 7,643,894 | B2 | 1/2010 | Braithwaite et al. |
| 7,657,910 | B1 | 2/2010 | McAulay et al. |
| 7,725,533 | B2 | 5/2010 | Szeto et al. |
| 7,725,551 | B2 | 5/2010 | Szeto et al. |
| 7,853,341 | B2 | 12/2010 | McCarty et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2007/0185926 | A1* | 8/2007 | Prahlad et al. .... G06F 17/30997 |
| 2007/0283008 | A1 | 12/2007 | Bucher et al. |
| 2008/0052371 | A1 | 2/2008 | Partovi et al. |
| 2008/0091717 | A1 | 4/2008 | Garbow et al. |
| 2008/0177893 | A1 | 7/2008 | Bowra et al. |
| 2010/0185671 | A1 | 7/2010 | Burba et al. |
| 2010/0328312 | A1 | 12/2010 | Donaldson |
| 2013/0343566 | A1 | 12/2013 | Triplett et al. |

OTHER PUBLICATIONS

"Bluetooth. "Specification of the Bluetooth System: Wireless connections made easy" Core, Version 1.0 B, Dec. 1, 1999, 1076 pages". (in four parts due to size).

"Dell, Inc. "Dell Digital Audio Receiver: Reference Guide" Jun. 2000, 70 pp.". (in two parts due to size).

"Dell, Inc. "Start Here" Jun. 2000, 2 pages".

"Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages".

"Presentations at WinHEC 2000" May 2000, 138 pages.

AudioTron Setup Guide, Version 3.0, Voyetra Turtle Beach, Inc., May 2002, 38 pages.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Buskirk; Eliot Van., "Music Needs 'Connective Tissue' and Facebook Wants to Build it", Evolver-1m, http://evolver.fm/2011/09/01/music-needs-connective-tissue-and-facebook-wants-to-build-iti, Sep. 1, 2011, 6 pages.

Jo J., et al., "Synchronized One-to-many Media Streaming with Adaptive Playout Control," Proceedings of SPIE, 2002, vol. 4861, pp. 71-82.

"UPnP; "Universal Plug and Play Device Architecture"; Jun. 8, 2000; version 1.0; Microsoft Corporation; pp. 1-54".

* cited by examiner

REMOTE STORAGE AND PROVISIONING OF LOCAL-MEDIA INDEX

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
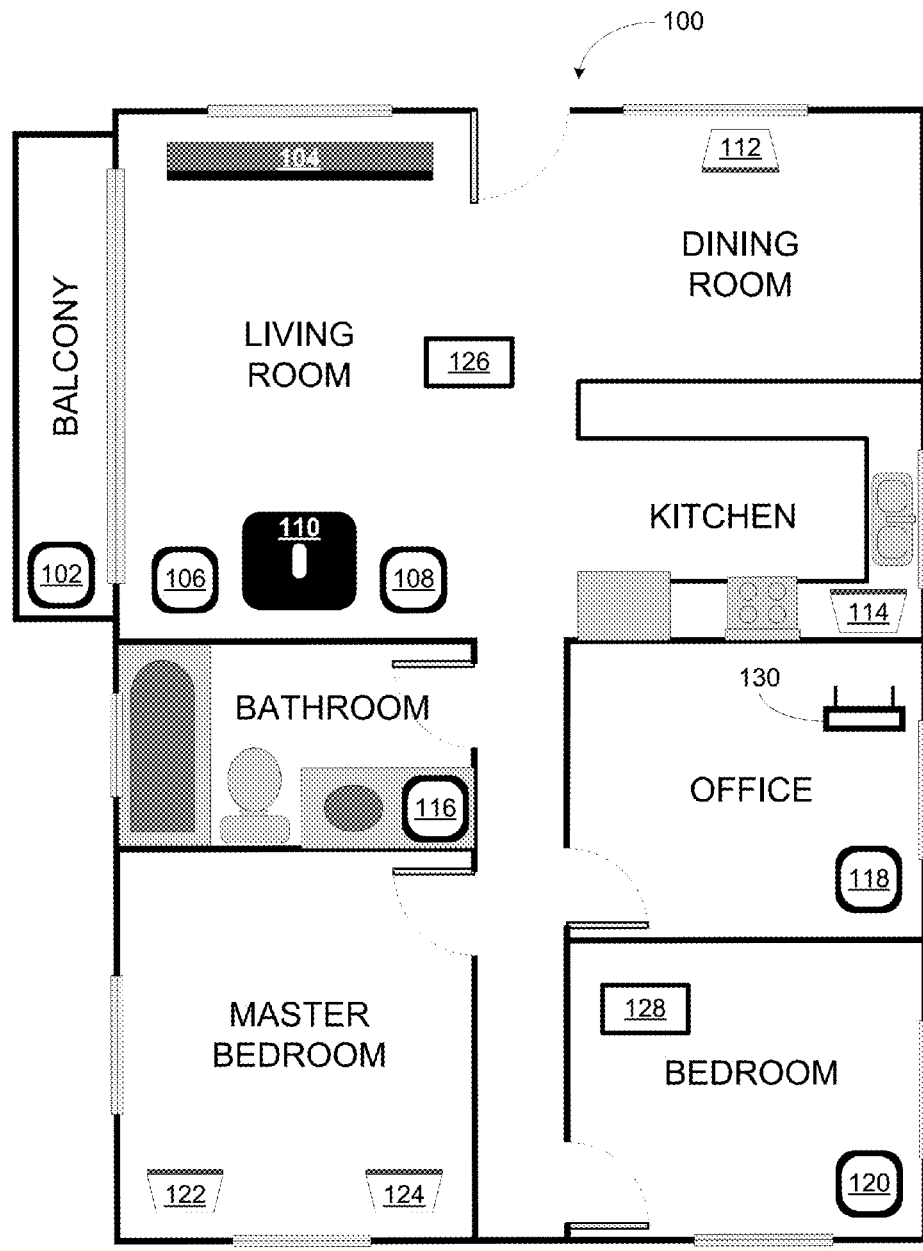
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, among other aspects, remote storage and provisioning of a local-media index. Such a local-media index may allow a media system within a local area network to identify multimedia items that are stored within the local area network (i.e. local media). In other words, one or more playback devices of the media playback system may access the multimedia items for playback by referencing the local-media index. For example, the local-media index may identify a file location within the local area network at which the particular multimedia item is stored. The one or more playback devices may then use the file location to locate a particular multimedia item for playback. A controller of the media playback system may use such a local-media index to display a list of the multimedia items identified by the local-media index (i.e. a multimedia library).

Such a local-media index may be stored on a playback device of the media playback system (i.e. local provisioning of a local-media index). However, such a configuration may limit a number of multimedia items that the local-media index is capable of indexing because of limited storage capacity within playback devices. Further, such local provisioning may limit a number of multimedia libraries that the media playback system is capable of supporting.

In one embodiment, the local-media index may be stored on a computing device that is remote from the local area network to which the media playback system is connected. For instance, the local-media index may be stored on a computing device accessible via a wide area network (WAN). The remote computing device may have more data storage than a device within the local area network such that the user may have a larger local-media index or multiple local-media indexes. In addition, such a configuration may involve relatively less network bandwidth than some other configurations because transferring the multimedia items over the wide area network may not be required.

In addition, storing a local-media index on a computing device that is remote from the local area network may assist in circumstances in which a user may has two or more media playback systems in different locations that are within two different local area networks. For example, a user may have one media playback system at home that is connected to a home local area network and another media playback system at work that is connected to a work local area network. When the local-media index is accessible over a wide area network, the media playback system at home and the media playback system at work may each access the local-media index over a wide area network. This arrangement may keep any changes to the local-media index consistent between the two or more media playback systems. While each local area network may have different local-media items stored therein, each respective media playback system may search other audio sources (e.g. streaming content sources) to provide consistent access to the multimedia items identified in the local-media index.

From time to time, the local-media index (i.e. a first local-media index) may become inaccessible over the wide area network due to various network connectivity issues and the like. In such a circumstance, the media playback system may then access a local-media index (i.e. a second local-media index) within the local area network. The second local-media index may, for example, include a portion of the plurality of multimedia items in the first-local media index. Alternatively, the media playback system may determine the second-local media index based on a list of multimedia items that have been played by the media playback system, such as a recently-played list. When the first local-media index is again accessible by the media playback system, the media playback system may then resume accessing the first local-media index that is remotely stored from the local area network.

As indicated above, the present application involves remote storage and provisioning of a local-media index. In one aspect, a method is provided. The method involves storing, by a computing system, a local-media index that identifies a plurality of multimedia items that are (1) stored within a local area network, and (2) accessible within the local area network by a playback device of a media playback system within the local area network, and sending a message over a wide area network that indicates at least a portion of the local-media index from the computing system to the media playback system.

In another aspect, a device is provided. The device includes a network interface, a processor, a data storage, a data storage, and a program logic stored in the data storage and executable by a processor to: store, in the data storage, a local-media index that identifies a plurality of multimedia items that are (1) stored within a local area network, and (2) accessible within the local area network by a playback device of a media playback system within the local area network, and send a message over a wide area network that indicates at least a portion of the local-media index from the computing system to the media playback system.

In yet another aspect, a non-transitory computer readable memory is provided. The non-transitory computer readable memory has stored thereon instructions executable by a computing device to cause the computing device to perform functions. The functions include storing, by a computing system, a local-media index that identifies a plurality of multimedia items that are (1) stored within a local area network, and (2) accessible within the local area network by a playback device of a media playback system within the local area network, and sending a message over a wide area network that indicates at least a portion of the local-media index from the computing system to the media playback system.

In another aspect, another method is provided. The method involves determining that a first local-media index is inaccessible over a wide area network to the media playback system, wherein the first local-media index identifies a plurality of multimedia items that are stored within a local area network, and wherein the first local-media index is stored on a computing device that is not within the local area network, and after determining that the first local-media index is inaccessible, providing an identification of at least one multimedia item based on a second local-media index that identifies a portion of the plurality of multimedia items.

In yet another aspect, another device is provided. The device includes a network interface, a processor, a data storage, a data storage, and a program logic stored in the data storage and executable by a processor to: determine that a first local-media index is inaccessible over a wide area network to the media playback system, wherein the first local-media index identifies a plurality of multimedia items that are stored within a local area network, and wherein the first local-media index is stored on a computing device that is not within the local area network, and after determining that the first local-media index is inaccessible, providing an identification of at least one multimedia item based on a second local-media index that identifies a portion of the plurality of multimedia items.

In another aspect, another non-transitory computer readable memory is provided. The non-transitory computer readable memory has stored thereon instructions executable by a computing device to cause the computing device to perform functions. The functions include determining that a first local-media index is inaccessible over a wide area network to the media playback system, wherein the first local-media index identifies a plurality of multimedia items that are stored within a local area network, and wherein the first local-media index is stored on a computing device that is not within the local area network, and after determining that the first local-media index is inaccessible, providing an identification of at least one multimedia item based on a second local-media index that identifies a portion of the plurality of multimedia items.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
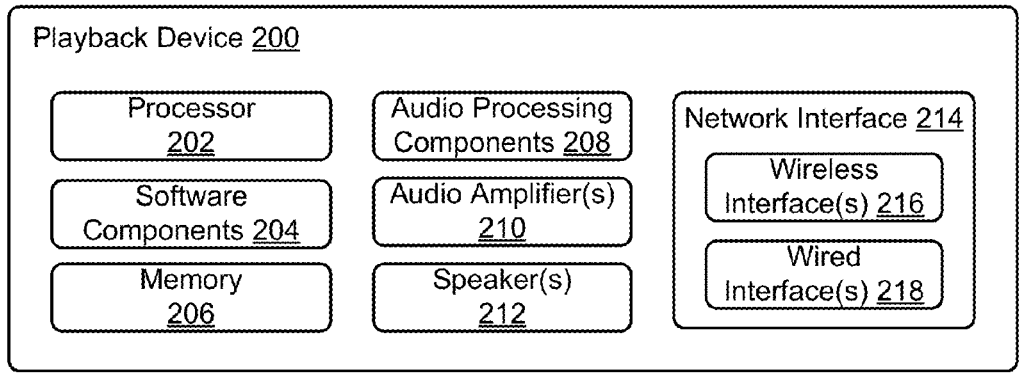
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s)) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
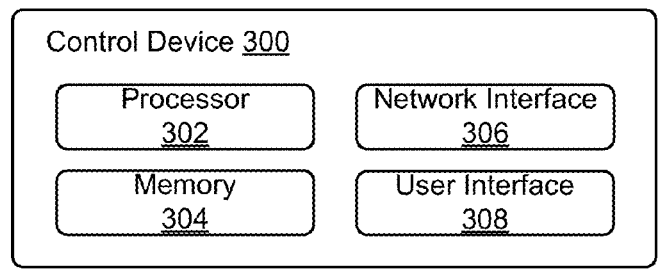
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
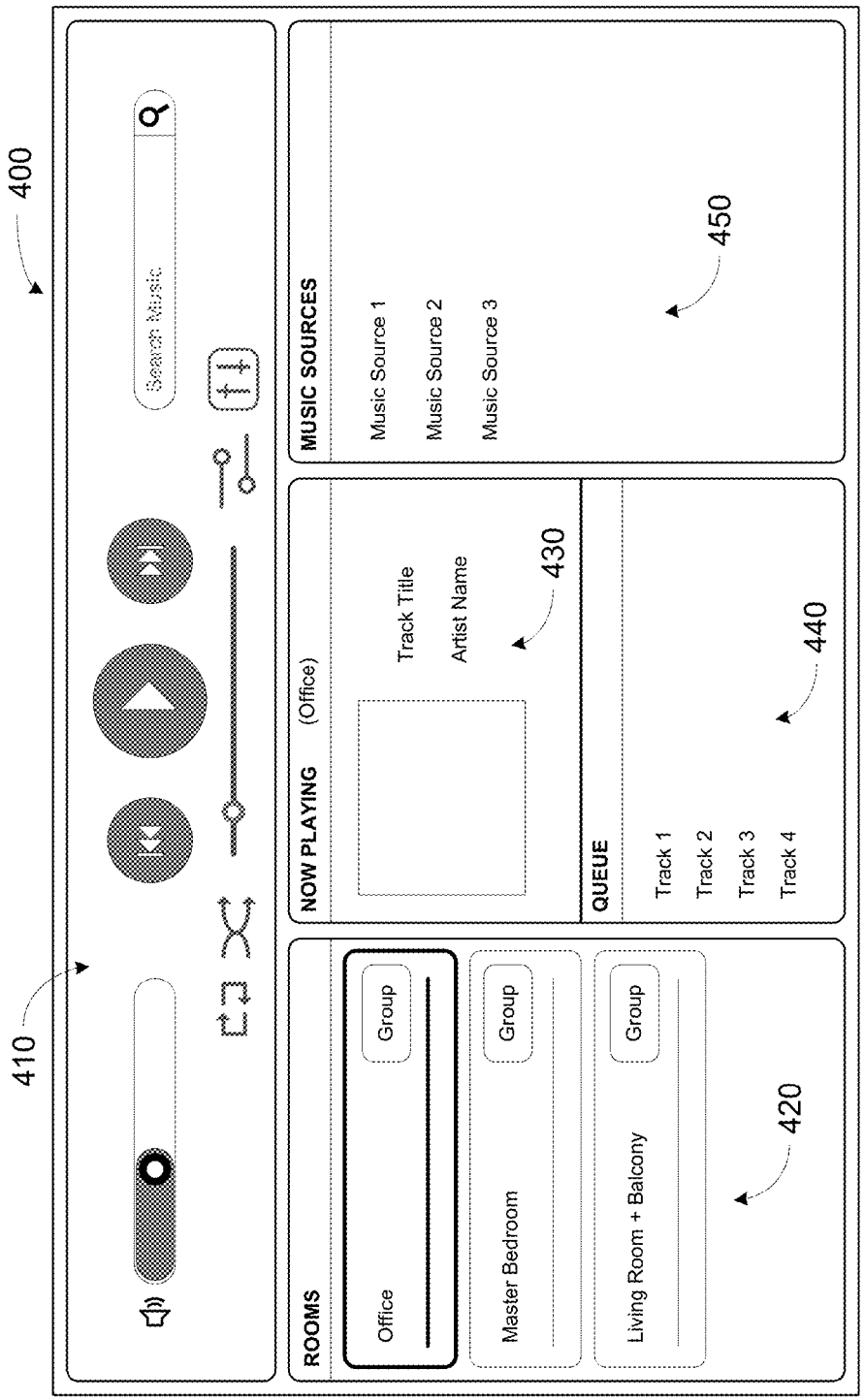
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system

100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a network-attached storage (NAS), for example), streaming audio services providing audio content via the Internet (e.g., the cloud), or audio sources connected to the media playback system via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Method for Storing a Local-Media Index on a Remote Computing Device As discussed above, embodiments described herein may involve storing a local-media index on a remote computing device. In one example method, a media playback system may store a local-media index that identifies a plurality of multimedia items that are (1) stored within a local area network, and (2) accessible within the local area network by a playback device of a media playback system within the local area network, and sending a message that indicates at least a portion of the local-media index from the computing system over a wide area network to the media playback system.

Figure 5:
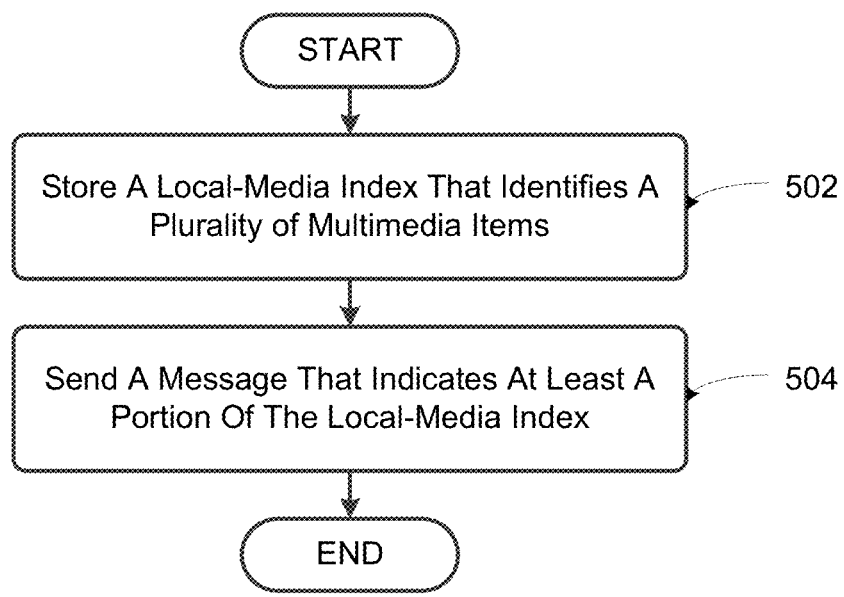
FIG. 5 shows an example flow diagram for storing a local-media index on a remote computing device.

Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-504. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

a. Storing a Local-Media Index that Identifies a Plurality of Multimedia Items.

At block 502, the method involves storing, by a computing system, a local-media index that identifies a plurality of multimedia items that are (1) stored within a local area network, and (2) accessible within the local area network by a playback device of a media playback system within the local area network.

The local-media index may identify multimedia items that are stored within a local area network (i.e. local media), such as on a computing device that is connected to the local area network. The local area network may be a computer network that interconnects network devices within a given geographic area, such as within a home or an office. In contrast, a wide area network, such as the Internet, may cover a relatively broader area. The local area network may be a sub-network (subnet) of the wide area network. A router may address network devices within the local area network within a certain address range (conventionally, e.g., under Internet Protocol v4, the 192.168.X.X address range). Network devices within the local area network may then access a wide area network through a gateway which routes between the local area network and the wide area network. The gateway may be a feature of the router, but other devices may also function as the gateway. Other network arrangements are possible as well.

Figure 7:
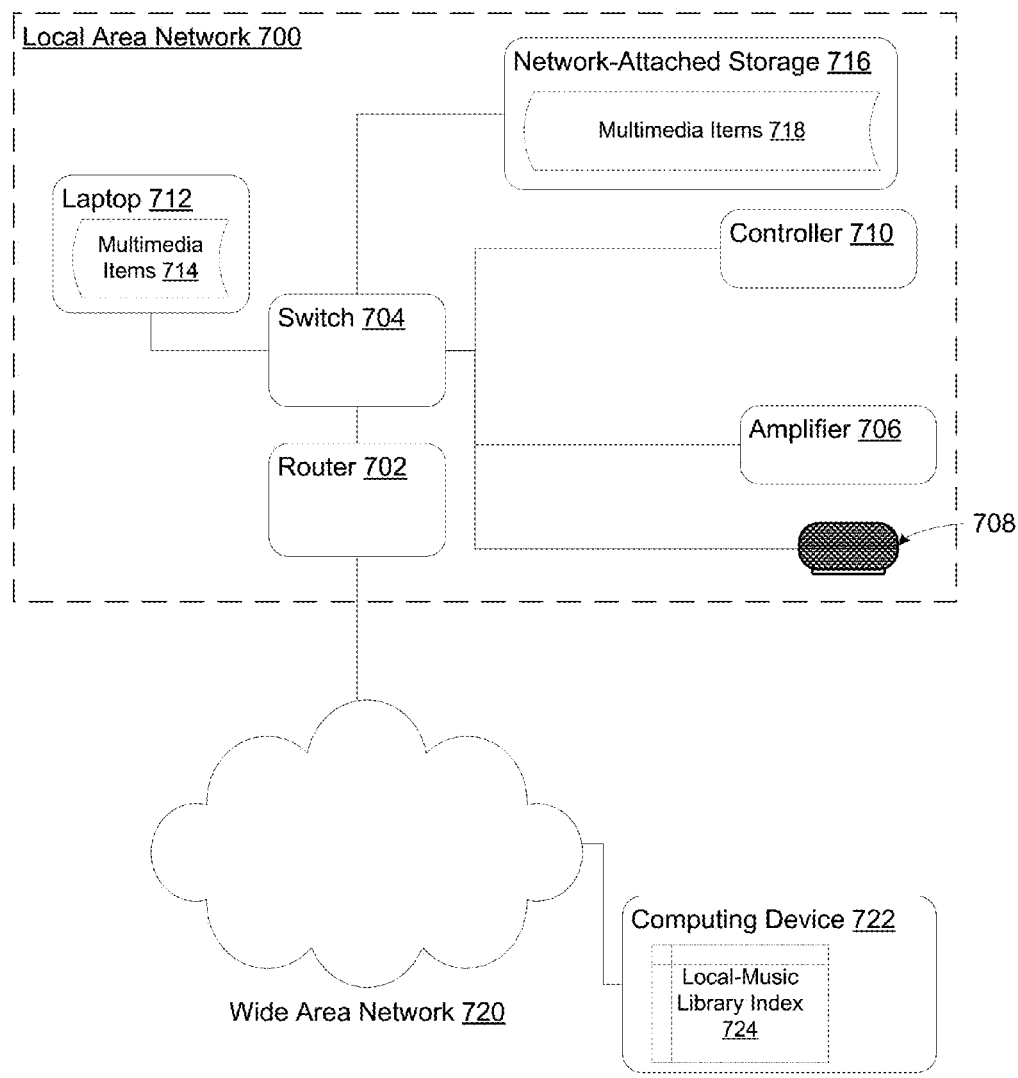
FIG. 7 shows an example operating environment in which the present methods may be practiced.

FIG. 7 shows a block diagram of an operating environment in which the example method may be practiced. The operating environment includes a local area network 700 and a wide area network 720. The local area network 700 and the wide area network are interconnected via router 702, which is functioning as a gateway.

Within the local area network, components of a media playback system are interconnected using switch 704. The media playback system includes amplifier 706 and playback device 708, which may take the form of, for example, playback device 200 of FIG. 2, or components thereof. The media playback device also includes controller 710, which may be embodied as control device 300 of FIG. 3, for example.

In operation, as shown in FIG. 7, a computing device 722 may store a local-music library index 724 that identifies a plurality of multimedia items (i.e. multimedia items 714 and/or multimedia items 718), as discussed further below.

In accordance with method 500, the computing system is not within the same local area network as the media playback system. To communicate with network devices within the local area network, such as components of the media playback system, the computing system may connect to the local area network over a wide area network. Messages that are sent between the computing system and the media playback system may route through the gateway and also through components of the wide area network, such as routers and switches. As shown in FIG. 7, computing device 722 is not within of local area network 700, but is connected to local area network 700 (and devices within the local area network) via wide area network 720.

Various components of the media playback system, such as one or more playback devices and/or controllers, may reference the local-media index to perform operations involving one or more multimedia files, such as adding a particular multimedia item to a playlist, or retrieving the multimedia file for playback by one or more playback devices.

The local-media index may identify multimedia items in a music library of the media playback system. Multimedia items stored within the local area network may be added to the music library. A controller of the media playback system may display a list (e.g. a music library) of the plurality of multimedia items in the local-media index. A user of the media playback system may then select multimedia items within the list for playback. For example, the controller may display the list of the plurality of multimedia items in the audio sources region 450 of the user interface 400 in FIG. 4.

The multimedia items may include various audio and/or video recordings. Each multimedia item is not required to incorporate more than one type of media (e.g. audio and video), but some multimedia items may include more than one type of media (e.g. a movie that includes video and audio). The recordings may be files within a file system such as File Allocation Table (FAT), New Technology File System (NTFS), Hierarchical File System Plus (HFS+), extended file system (ext), or ZFS, among many other examples now known or later developed. The files may be stored in any known or later developed file format for storing a recording, such as Waveform Audio File (WAV), MPEG Audio Layer III (MP3), Windows Media Audio (WMA), Advanced Audio Coding (AAC), Ogg, Apple Lossless, or Free Lossless Audio Codec (FLAC).

For each multimedia item in the plurality of multimedia items, the local-media index may include a respective file location within the local area network for the multimedia item. The respective file location may be, for example, a URI, a URL, or some other identifier that may be used to point at a multimedia item stored within a local audio content source or a networked audio content source for retrieval of that multimedia item. For instance, a user may have audio files stored on a laptop. For each audio file on the laptop, the local-media index may then point to the location of the audio file on the laptop. In another example, the user may have audio files stored on a NAS device that is connected to the user's local area network and the local-media index may then point to the network file location for each audio file.

Referring back to FIG. 7, computing devices connected to the local area network 700 may be content sources for the media playback system. As shown in FIG. 7, a laptop 712 stores multimedia items 714 which may be accessed within the local area network by the media playback system (e.g. amplifier 706, playback device 708, and/or controller 710). In addition, a network-attached storage 716 stores multimedia items 718 which may be accessible to the media playback system. Other devices within the local area network may also store multimedia items for access by the media playback system as well. As noted above, the media playback content may also access content, such as streaming audio, over the Internet, in addition to local content.

For multimedia items in the plurality of multimedia items, the local-media index may include one or more items of metadata. Such one or more items of metadata may include, for example, an artist name, an album name, a track name, a track number, or a track length. Additional types of metadata may be included as well, such as album art, for example. Each multimedia item is not required to include the same types of metadata as other multimedia items within the local-media index.

The computing system that stores the local-media index may be any computing system having suitable data storage. For instance, the data storage may be direct attached storage, such as a data drive connected over a computer bus such as Serial ATA (SATA) or Universal Serial Bus (USB). Alternatively, the data storage may be networked storage, such as a Storage Area Network (SAN) device or network-attached storage device. Other examples, including those now known or later developed, may exist.

The local-media index may have an identifier that indicates a unique user that is assigned to a media playback system. For instance, the identifier may indicate a user name of the unique user. The computing system may store a plurality of local-media indexes each for different respective users. Each identifier may differentiate the local-media index from other local-media indexes stored by the computing system.

The computing system may receive the local-media index over a wide area network from the media playback system. For instance, the computing system may initially receive the local-media index as part of a set-up procedure. Such a set-up procedure may involve the media playback system indexing local-media items into a local-media index and then sending the local-media index to the computing device. Then, when new multimedia items are available within the local area network, the computing system may receive a new local-media index that may replace the stored local-media index. Alternatively, the computing system may receive a message indicating one or more multimedia items which may prompt the computing system to include identifications for the one or more multimedia items within the local-media index. The computing system may then add the multimedia items from the local-media index. Or, in some circumstances, the message may cause the computing device to remove one or more multimedia items from the local-media index.

b. Sending a Message that Indicates at Least a Portion of the Local-Media Index.

At block 504, the method involves sending, by the computing system, a message that indicates at least a portion of the local-media index. The computing system may send the message over a wide area network to the media playback system.

Referring back to FIG. 7, computing device 722 may send a message that indicates at least a portion of the local-media index 724 over the wide area network 720 to the media playback system. One or more components of the media playback system, such as the controller 710, amplifier 706, or playback device 708, may receive the message.

Within examples, before sending the message that indicates at least a portion of the local-media index, the computing device may receive a request, from the media playback system over the wide area network, to send the message to the media playback system. The media playback system may send such a request when performing an operation that involves accessing the local-media index. For instance, a controller of the media playback system may send such a request when providing a list of multimedia items in a music library for display. As another example, a playback device of the media playback system may send such a request as an aspect of queuing a multimedia item for playback.

The request may indicate the portion of the local-media index to include in the message. For instance, the portion may include particular multimedia files that are in a playlist that is queued for playback by the media playback system. Alternatively, the portion may include the entire local-media index. Then, after receiving the message, the media playback system may cache the local-media index within the local area network.

In addition, the request may also indicate the identifier of the media playback system. Then, upon receiving the request, the computing device may retrieve the local-media index for the unique user that is assigned to the media playback system for inclusion in the message.

IV. Example Method for Local Provisioning of Local-Media Index when a Remote Local-Media Index is Inaccessible As discussed above, embodiments described herein may involve storing a local-media index on a remote computing device.

Figure 6:
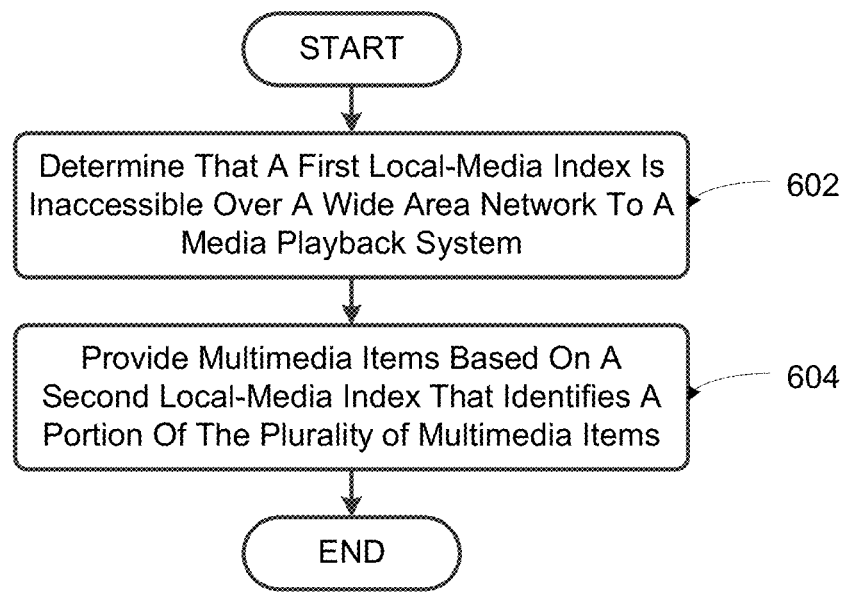
FIG. 6 shows an example flow diagram for local provisioning of a local-media index when a remote local-media index is inaccessible.

Method 600 shown in FIG. 6 presents an embodiment of a method that can be implemented within an operating environment involving, for example, the media playback system 100 of FIG. 1, one or more of the playback device 200 of FIG. 2, and one or more of the control device 300 of FIG. 3. Method 600 may include one or more operations, functions, or actions as illustrated by one or more of blocks 602-604. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

a. Determining that the First Local-Media Index is Inaccessible Over a Wide Area Network to the Media Playback System.

At block 602, the method involves determining that the first local-media index is inaccessible over a wide area network to the media playback system. The first local-media index may identify a plurality of multimedia items that are stored within the local area network. In addition, the plurality of multimedia items may be accessible, over the local area network, to a playback device of a media playback system within the local area network. In some embodiments, the controller may determine that the first local-media index is inaccessible over the wide area network. In other embodiments, the playback device may determine that the first local-media index is inaccessible over the wide area network.

The first local-media index is stored on a computing device that is not within the local area network. For instance, the first local-media index may be stored on a computing device, such as computing device 722 in FIG. 7, which is not within local area network 700. However, the first local-media index may be accessible, over the wide area network, to devices within the local area network. For example, computing device 722 may send the local-music library index, or a portion thereof, to the media playback system over wide area network 720.

Determining that the first local-media index is inaccessible over the wide area network may involve sending a message to a computing system over the wide area network. The computing system may have the first local-media index stored thereon, or the computing system may otherwise have access to the first local-media index. Within examples, the message may request a response from the computing system. For instance, the message may request a response that indicates the first local-media index or a portion thereof. The media playback system may then determine that first local-media index is inaccessible when the response is not received within a pre-determined amount of time from sending the message (e.g. a time-out period). Alternatively, the message may include Internet Control Message Protocol (ICMP) echo request packets. The media playback system may then wait for an IMCP response from the computing device. The media playback system may then determine that first local-media index is inaccessible when the ICMP response is not received within the time-out period. Other examples are possible as well. Other examples may exist as well.

Figure 8:
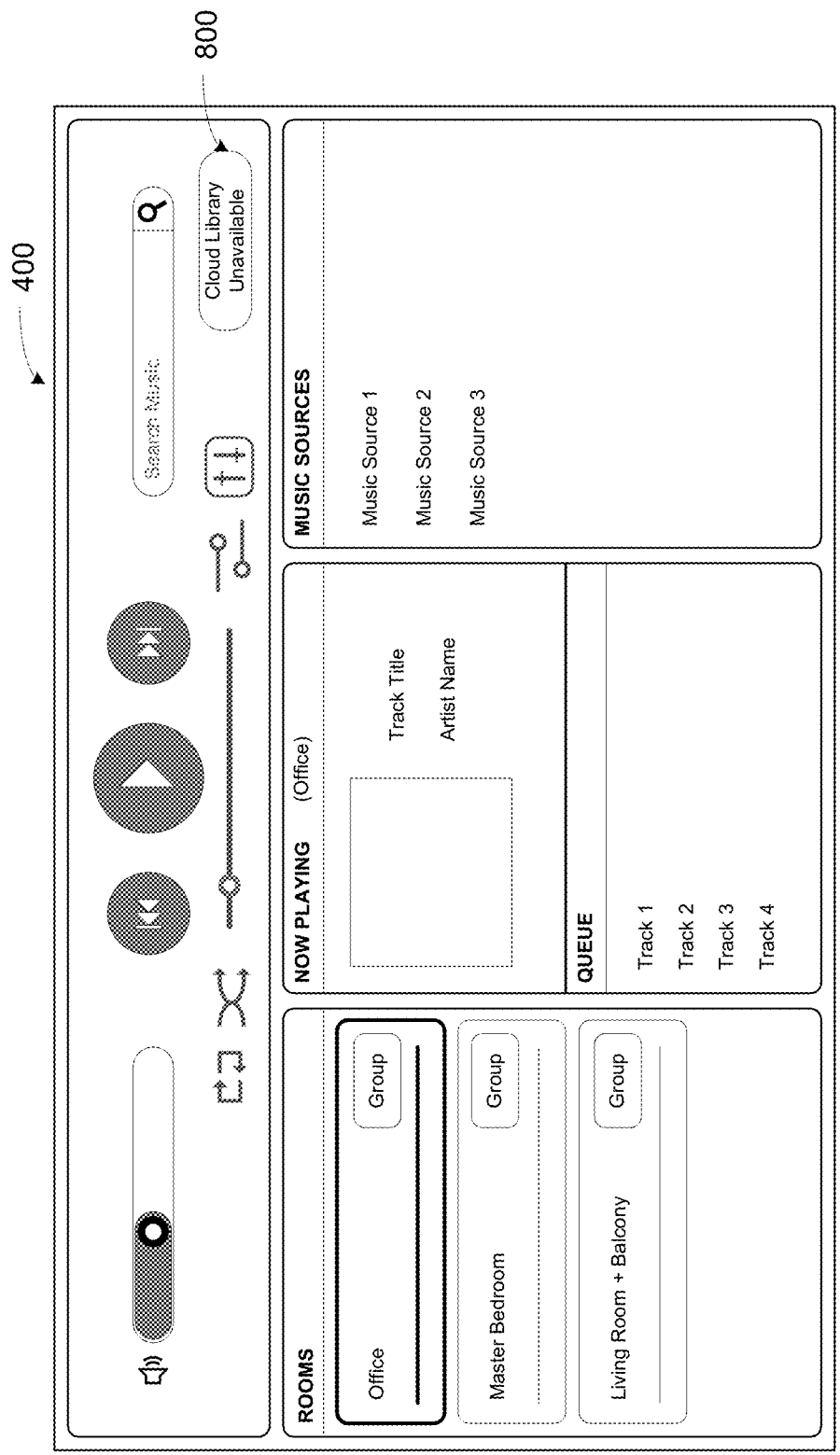
FIG. 8 shows another example controller interface.

After determining that the first local-media index is inaccessible over the wide area network, the media playback system may output an indication that the first local-media index is unavailable. For instance, the controller of the media playback system may display an indication. FIG. 8 shows user interface 400 of FIG. 4. Displayed on user interface 400 is an indication 800 ("Cloud Library Unavailable") that the first local-media index is unavailable. Alternatively, the playback device of the media playback system may output an alert sound or message to indicate that the first local-media index is unavailable.

b. Providing an Identification of at Least One Multimedia Item Based on a Second Local-Media Index that Identifies a Portion of the Plurality of Multimedia Items.

At block 604, after determining that the first local-media index is inaccessible, the method involves providing an identification of at least one multimedia item based on a second local-media index that identifies a portion of the plurality of multimedia items. Providing an identification of at least one multimedia item may involve, for example, the controller providing a list of the at least one multimedia item for display. The second local-media index may identify at least a portion of the multimedia items that are identified by the first local-media index.

In some embodiments, the media playback system may determine the second local-media index based on data indicating multimedia items that have been played by the media playback system. For example, the data may include one or more lists of recently-played multimedia items, most popular (i.e. played most often) multimedia items, multimedia items that have been marked as "favorites," or multimedia items in saved playlists, among other examples. Such items may be added to the second local-media index. In addition, from time to time, such as when multimedia items are played back by the media playback system or after a period of time has elapsed, the media playback system may update the one or more lists such that the recently-played, most popular, or "favorite" multimedia items are kept up-to-date with the multimedia items that have been played back by the media playback system. The media playback system may then add or remove multimedia items from the second local-media index to keep the second local-media index in sync with the one or more lists. Alternatively, the media playback system may use the one or more lists directly as the second local-media index.

Further, in some embodiments, the one or more lists may be displayed to the user. For instance, the one or more lists may be displayed as playlists. The controller of the media playback system may be configured for addition or removal of multimedia items from the media playback index by a user, such as by adding or removing multimedia items from the playlists. Other examples are possible as well.

Within examples, the media playback system may determine the second local-media index either before or after determining the first local-media index is inaccessible. For instance, after determining that the first local-media index is inaccessible, the media playback system may retrieve the determined second local-media index from a data storage within the local area network. Such a second local-media index may be determined before the first local-media index is unavailable and then cached for retrieval when the first local-media index is inaccessible. Alternatively, the media playback system may determine the second local-media index in response to determining that the first local-media index is unavailable. Other examples are possible as well.

Providing an identification of at least one multimedia item may involve a controller providing for display a list of the multimedia items. For instance, controller 710 of FIG. 7 may display the list of the at least one multimedia item. The list may be, for instance, a representation of a music library. In one example, the list may be displayed in the audio sources region 450 of user interface 400 in FIG. 4. Alternatively, the list may be a representation of a playlist, which may be displayed in the playback queue region 440 of user interface 400, for example.

In some embodiments, a playback device may receive the multimedia items over the local area network and provide for playback the multimedia items. For instance, amplifier 706 or playback device 708 may receive the multimedia items over local area network 700 from laptop 712 or network-attached storage 716 that have, respectively, multimedia items 714 and 718 stored thereon. Amplifier 706 or playback device 708 may then playback the multimedia items.

Figure 9:
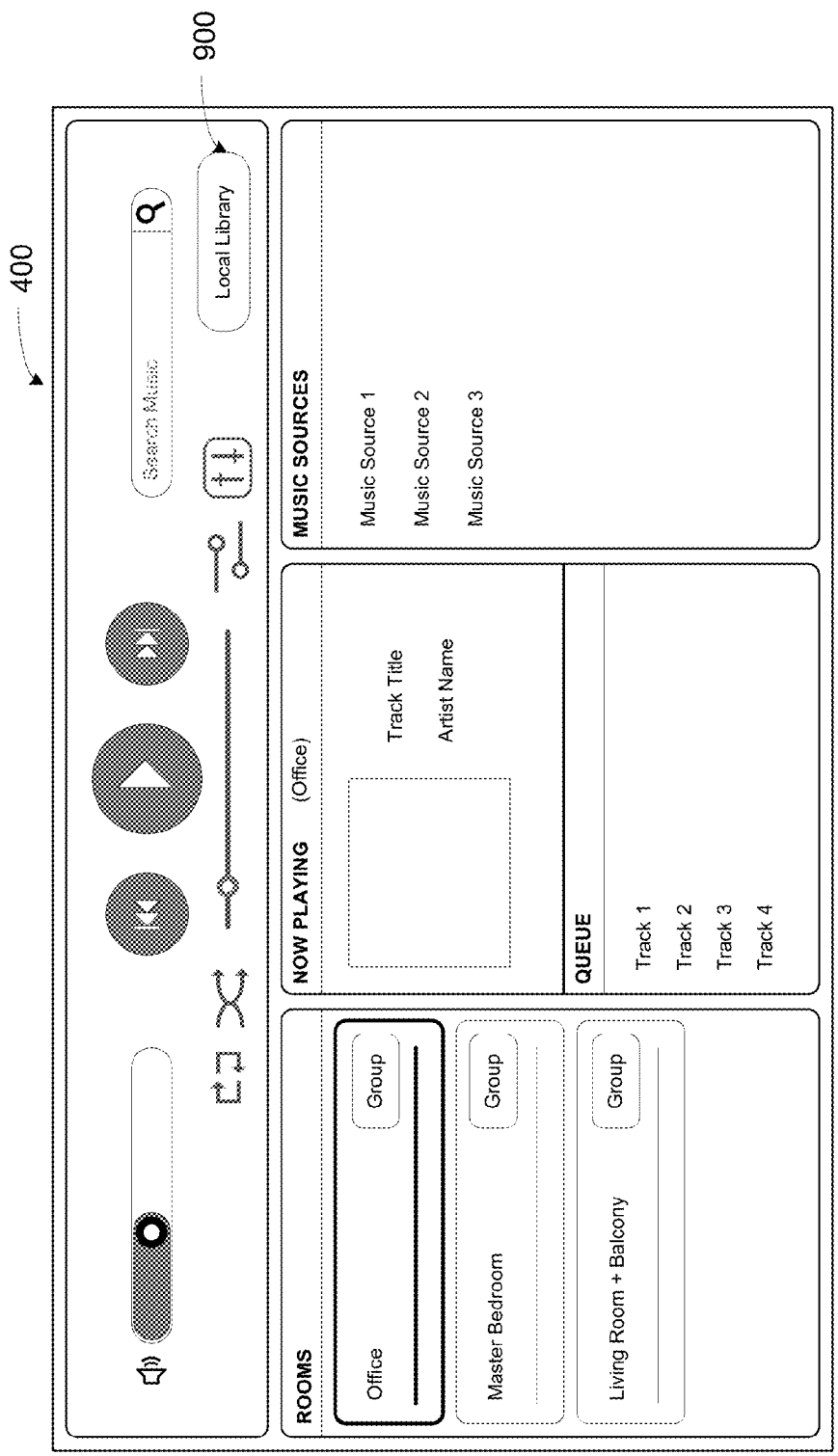
FIG. 9 shows yet another example controller interface.

The media playback system may output an indication that the multimedia items are provided based on the second local-media index. For instance, the controller of the media playback system may display an indication. FIG. 9 shows user interface 400 of FIG. 4. Displayed on user interface 400 is an indication 900 that the second local-media index ("Local Library") is active (i.e. the media playback system is currently providing identification of at least one multimedia item based on the second local-media index). Alternatively, the playback device of the media playback system may output an alert sound or message to indicate that the multimedia items are provided based on the second local-media index.

In some embodiments, after providing an identification of at least one multimedia item based on the second local-media index, the media playback system determines that the first local-media index is accessible over the wide area network. For instance, the media playback system may send a message, over the wide area network, to the computing system that is associated with the first local-media index. Then, after determining that the first local-media index is accessible, the media playback device may provide an identification of at least one multimedia item based on the first-local media index.

Further, after determining that the first local-media index is accessible over the wide area network, the media playback system may send a request to the computing system to send a message indicating at least a portion of the first-local media index. The request may indicate the portion of the local-media index to include in the message. For instance, the portion may include particular multimedia files that are in a playlist that is queued for playback by the media playback system. Alternatively, the portion may include the entire first local-media index. Other examples are possible as well.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves remote storage and provisioning of a local-media index. In one aspect, a method is provided. The method involves storing, by a computing system, a local-media index that identifies a plurality of multimedia items that are (1) stored within a local area network, and (2) accessible within the local area network by a playback device of a media playback system within the local area network, and sending a message over a wide area network that indicates at least a portion of the local-media index from the computing system to the media playback system.

In another aspect, a device is provided. The device includes a network interface, a processor, a data storage, a data storage, and a program logic stored in the data storage and executable by a processor to: store, in the data storage, a local-media index that identifies a plurality of multimedia items that are (1) stored within a local area network, and (2) accessible within the local area network by a playback device of a media playback system within the local area network, and send a message over a wide area network that indicates at least a portion of the local-media index from the computing system to the media playback system.

In yet another aspect, a non-transitory computer readable memory is provided. The non-transitory computer readable memory has stored thereon instructions executable by a computing device to cause the computing device to perform functions. The functions include storing, by a computing system, a local-media index that identifies a plurality of multimedia items that are (1) stored within a local area network, and (2) accessible within the local area network by a playback device of a media playback system within the local area network, and sending a message over a wide area network that indicates at least a portion of the local-media index from the computing system to the media playback system.

In another aspect, another method is provided. The method involves determining that a first local-media index is inaccessible over a wide area network to the media playback system, wherein the first local-media index identifies a plurality of multimedia items that are stored within a local area network, and wherein the first local-media index is stored on a computing device that is not within the local area network, and after determining that the first local-media index is inaccessible, providing an identification of at least one multimedia item based on a second local-media index that identifies a portion of the plurality of multimedia items.

In yet another aspect, another device is provided. The device includes a network interface, a processor, a data storage, a data storage, and a program logic stored in the data storage and executable by a processor to: determine that a first local-media index is inaccessible over a wide area network to the media playback system, wherein the first local-media index identifies a plurality of multimedia items that are stored within a local area network, and wherein the first local-media index is stored on a computing device that is not within the local area network, and after determining that the first local-media index is inaccessible, providing an identification of at least one multimedia item based on a second local-media index that identifies a portion of the plurality of multimedia items.

In another aspect, another non-transitory computer readable memory is provided. The non-transitory computer readable memory has stored thereon instructions executable by a computing device to cause the computing device to perform functions. The functions include determining that a first local-media index is inaccessible over a wide area network to the media playback system, wherein the first local-media index identifies a plurality of multimedia items that are (1) stored within a local area network, and (2) accessible, over the local area network, to a playback device of a media playback system within the local area network, and wherein the first local-media index is stored on a computing device that is not within the local area network, and after determining that the first local-media index is inaccessible, providing an identification of at least one multimedia item based on a second local-media index that identifies a portion of the plurality of multimedia items.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method comprising:
   detecting, by a control device of a media playback system, input data that causes the control device to access a first local-media index that identifies a plurality of multimedia items which are stored within a local area network, wherein the first local-media index is stored on a computing device that is not within the local area network;
   determining that the first local-media index is inaccessible over the wide area network to the media playback system, wherein the media playback system comprises one or more playback devices; and
   after determining that the first local-media index is inaccessible, providing an identification of at least one multimedia item based on a second local-media index that identifies a portion of the plurality of multimedia items.

2. The method of claim 1, wherein providing the identification of at least one multimedia item comprises providing for display a list of the portion of the plurality of multimedia items, wherein the portion of the plurality of multimedia items are available for playback by the one or more playback devices of the media playback system.

3. The method of claim 1,
   wherein providing the identification of at least one multimedia item comprises providing for display a representation of media items identified in a playback queue that is associated with at least one playback device of the media playback system, wherein the queue includes at least one of the plurality of multimedia items.

4. The method of claim 1, further comprising:
   receiving data indicating multimedia items that have been played by the media playback system; and
   determining the second local-media index based on the data indicating the multimedia items, wherein determining the second local-media index comprises identifying one or more media items that have been played more than a threshold number of instances to include in the second local-media index.

5. The method of claim 1, further comprising:
   after providing an identification of at least one multimedia item based on the second local-media index, determining that the first local-media index is accessible over the wide area network; and
   after determining that the computing system that the first local-media index is accessible, providing an identification of at least one multimedia item based on the first local-media index.

6. The method of claim 5, further comprising:
   after determining that the first local-media index is accessible over the wide area network, sending a request that causes the computing system to send a message indicating at least a portion of the first local-media index.

7. The method of claim 1, wherein for each of the plurality of multimedia items in the first local-media index, the local-media index includes a respective file location for the multimedia item within the local area network.

8. The method of claim 1, further comprising:
after determining that the first local-media index is inaccessible, outputting an indication that the first local-media index is unavailable.

9. A non-transitory computer-readable medium having stored therein instructions executable by one or more processors to cause a control device to perform operations comprising:
detecting input data that causes the control device to access a first local-media index that identifies a plurality of multimedia items which are stored within a local area network, wherein the first local-media index is stored on a computing device that is not within the local area network;
determining that the first local-media index is inaccessible over the wide area network to the media playback system, wherein the media playback system comprises one or more playback devices; and
after determining that the first local-media index is inaccessible, providing an identification of at least one multimedia item based on a second local-media index that identifies a portion of the plurality of multimedia items.

10. The non-transitory computer-readable medium of claim 9, wherein detecting input data that causes the control device to access the first local-media index comprises detecting input data that causes the control device to display at least a portion of a music library that includes the plurality of multimedia items which are stored within the local area network.

11. The non-transitory computer-readable medium of claim 10, wherein providing the identification of at least one multimedia item comprises displaying a list of the portion of the plurality of multimedia items, wherein the portion of the plurality of multimedia items are available for playback by the one or more playback devices of the media playback system.

12. The non-transitory computer-readable medium of claim 9, wherein detecting input data that causes the control device to access the first local-media index comprises detecting input data that causes the control device to display a representation of media items identified in a playback queue that is associated with at least one playback device of the media playback system, wherein the queue includes at least one of the plurality of multimedia items.

13. The non-transitory computer-readable medium of claim 12, wherein providing the identification of at least one multimedia item comprises providing for display a representation of media items identified in the playback queue that is associated with at least one playback device of the media playback system.

14. The non-transitory computer-readable medium of claim 9, wherein the operations further comprise:
receiving data indicating multimedia items that have been played by the media playback system; and
determining the second local-media index based on the data indicating the multimedia items, wherein determining the second local-media index comprises identifying one or more media items that have been played more than a threshold number of instances to include in the second local-media index.

15. The non-transitory computer-readable medium of claim 9, wherein the operations further comprise:
after providing an identification of at least one multimedia item based on the second local-media index, determining that the first local-media index is accessible over the wide area network; and
after determining that the computing system that the first local-media index is accessible, providing an identification of at least one multimedia item based on the first local-media index.

16. The non-transitory computer-readable medium of claim 9, wherein the operations further comprise:
after determining that the first local-media index is accessible over the wide area network, sending a request that causes the computing system to send a message indicating at least a portion of the first local-media index.

17. The non-transitory computer-readable medium of claim 9, wherein for multimedia items in the first local-media index, the local-media index includes a respective file location for the multimedia item within the local area network.

18. The non-transitory computer-readable medium of claim 9, wherein the operations further comprise:
after determining that the first local-media index is inaccessible, displaying an indication that the first local-media index is unavailable.

19. The non-transitory computer-readable medium of claim 9, wherein the operations further comprise:
detecting one or more additional media items within the local area network are not included in the first-local media index; and
sending an instruction that causes the computing device that is not within the local area network to include the one or more additional media items in the first local-media index.

20. A control device comprising:
one or more processors; and
tangible non-transitory computer-readable memory have instructions encoded therein, wherein the instructions, when executed by the one or more processors, cause the playback device to perform operations comprising:
detecting input data that causes the control device to access a first local-media index that identifies a plurality of multimedia items which are stored within a local area network, wherein the first local-media index is stored on a computing device that is not within the local area network;
determining that the first local-media index is inaccessible over the wide area network to the media playback system, wherein the media playback system comprises one or more playback devices; and
after determining that the first local-media index is inaccessible, providing an identification of at least one multimedia item based on a second local-media index that identifies a portion of the plurality of multimedia items.

* * * * *